(12) United States Patent
Tobin

(10) Patent No.: US 11,760,257 B2
(45) Date of Patent: Sep. 19, 2023

(54) MOUNT FOR INVERTED LIGHT

(71) Applicant: Michael W. Tobin, St. Charles, MO (US)

(72) Inventor: Michael W. Tobin, St. Charles, MO (US)

( * ) Notice: Subject to any disclaimer, the term of this patent is extended or adjusted under 35 U.S.C. 154(b) by 0 days.

(21) Appl. No.: 17/681,209

(22) Filed: Feb. 25, 2022

(65) Prior Publication Data

US 2022/0340075 A1    Oct. 27, 2022

Related U.S. Application Data

(63) Continuation of application No. 63/153,786, filed on Feb. 25, 2021.

(51) Int. Cl.
| | |
|---|---|
| *F21V 21/088* | (2006.01) |
| *B60Q 1/26* | (2006.01) |
| *B60Q 7/00* | (2006.01) |
| *F21Y 115/10* | (2016.01) |

(52) U.S. Cl.
CPC ............ *B60Q 1/268* (2013.01); *B60Q 1/2611* (2013.01); *F21V 21/088* (2013.01); *B60Q 7/00* (2013.01); *F21Y 2115/10* (2016.08)

(58) Field of Classification Search
CPC ........ B60Q 1/268; B60Q 1/2611; B60Q 7/00; B60Q 1/247; B60Q 1/2615; B60Q 1/323; F21V 21/088; F21Y 2115/10
See application file for complete search history.

(56) References Cited

U.S. PATENT DOCUMENTS

| | | | | |
|---|---|---|---|---|
| 4,449,167 | A | * | 5/1984 | Cohen .................... B60Q 1/302 |
| | | | | 362/523 |
| 4,591,954 | A | * | 5/1986 | Kawamura ............ B60Q 1/302 |
| | | | | 340/815.45 |
| 4,949,071 | A | * | 8/1990 | Hutchison .............. B60Q 1/503 |
| | | | | 362/802 |
| D352,737 | S | * | 11/1994 | Roberts ......................... D20/42 |
| 2009/0013922 | A1 | * | 1/2009 | Lin ........................ B60Q 1/381 |
| | | | | 116/28 R |
| 2016/0305616 | A1 | * | 10/2016 | Lin .......................... F21V 29/70 |
| 2018/0079353 | A1 | * | 3/2018 | Litke ................. B32B 17/10339 |
| 2018/0170245 | A1 | * | 6/2018 | Snider ..................... F21S 43/15 |

FOREIGN PATENT DOCUMENTS

CN           204986668 U    *    1/2016

OTHER PUBLICATIONS

English translation of Tan CN-204986668-U, published Jan. 2016 (Year: 2016).*

* cited by examiner

*Primary Examiner* — Evan P Dzierzynski
(74) *Attorney, Agent, or Firm* — Charles McCloskey

(57) ABSTRACT

A mount for inverted light has a back, two spaced apart feet beneath the back, two tabs outwardly from the back, each tab having two pieces, an arcuate shroud opposite the back and an adjustment mechanism for the tabs. Opposite the back, the feet and tabs have a low friction surface limiting engagement of the mount with door glass. The adjustment mechanism includes knobs turning rack pinion gearing and knobs ratcheting one piece of a tab outwardly from the other. Beneath the shroud, the mount has two rests that receive a light attached to them aimed downward from the shroud. The mount has an elongated form for a generally centered position along the width of a door's window.

8 Claims, 3 Drawing Sheets

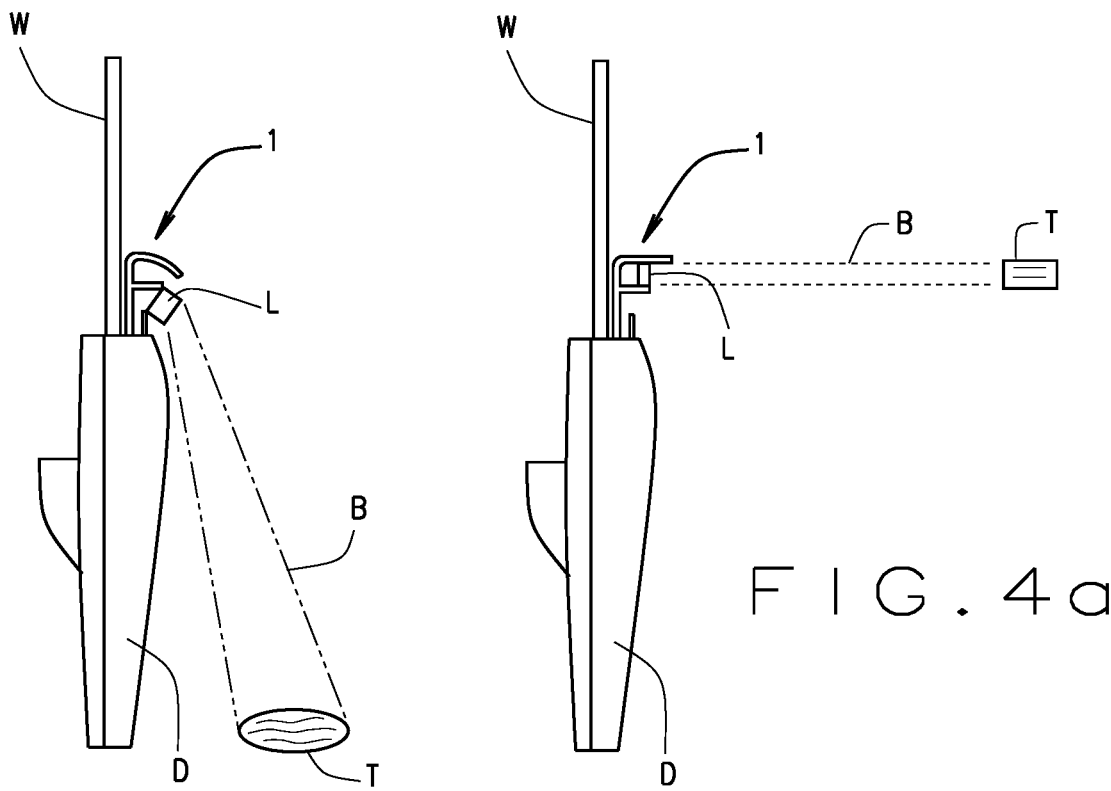
FIG. 4
FIG. 4a
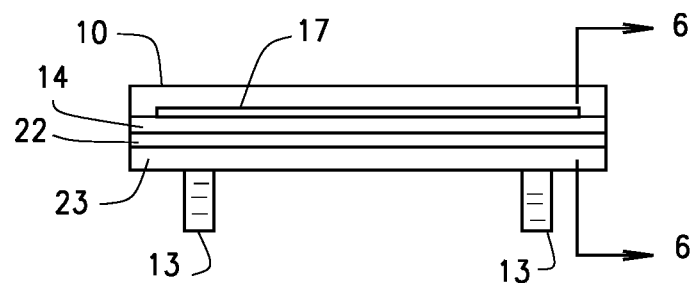
FIG. 5
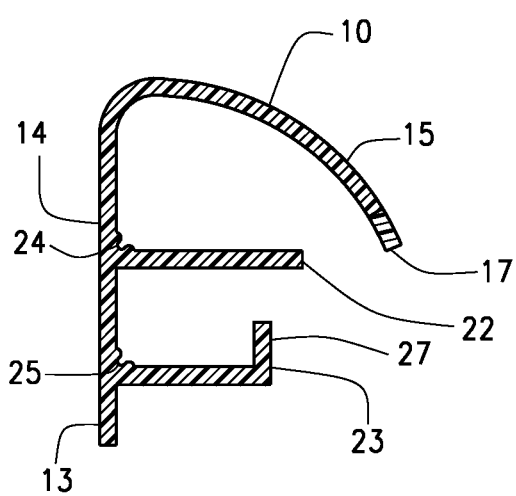
FIG. 6

MOUNT FOR INVERTED LIGHT

CROSS-REFERENCE TO RELATED APPLICATION

This non-provisional application claims priority to pending provisional application No. 63/153,786 filed on Feb. 25, 2021 and both are owned by the same inventor.

BACKGROUND OF THE INVENTION

The mount for inverted light generally relates to law enforcement equipment and more specifically to a mount installed upon a vehicle door at the window that aims a light downward.

For centuries, sovereigns delegated the keeping of order to various persons and entities. This left the sovereign's military available to counter foreign threats. In some areas, local cities formed and hired corps of watchmen. The watchmen would perform that task and watch their assigned area during darkness. In time, sovereigns expanded and merged their territory into nations.

Some nations expanded abroad through colonies. The colonies, much like provinces and cities of old, had military initially keeping order and deterring incursions from the frontiers. In time colonies formed their own patrols so that order would be kept.

One set of colonies became the United States. Here, police forces began in select cities, such as Boston in 1838 following a few years later by New York. The police forces protected persons, trade, and property. Over the decades, policing evolved to follow crime and to meet political restrictions. In recent years, police forces have become known as law enforcement.

Law enforcement officers, first responders, officers, DOT, recovery and other motorists often exit their vehicles into or near traffic lanes creating a safety hazard, especially in low light or inclement weather conditions. Technology has in recent years developed light emitting diode, or LED, warning lights. These LED lights have grown in brightness and ability to display intense and specialized signals.

Lighting products have appeared that project a ring of light, a flashing warning light, a distinctive pattern, and even messages on the ground surface surrounding a vehicle or an object to create a visual safety, or no drive through, zone. Meanwhile, police or law enforcement automotive vehicles become smaller as the amount of police equipment expands.

The rising number of active shooter situations and fluctuating terrorist threats call for more law enforcement officers to respond differently than in the recent past. Law enforcement officers must respond directly to the scene, such as the Boston marathon bombing, the Sandy Hook, Conn. school shooting, and the Aurora, Colo. movie theater shooting. Law enforcement officers must have their equipment with them and deter bystanders from interference or even danger. Lighting upon vehicles must remain secure. The need for preparation and swift response has expanded from just the patrol units and SWAT teams to others. Even off-duty officers must have the preparation and equipment to respond directly to a scene. Management of law enforcement, such as command staff, administrators, and detectives must also prepare and equip themselves to respond to a scene as well. As these various persons prepare and respond to a scene, security of the equipment and convenience to a law enforcement officer become critical to effective and safe deployments. From time to time though, a law enforcement vehicle reaches the end of its useful life. When a replacement vehicle appears for a law enforcement fleet, mechanics then seek lighting that transfers readily from one vehicle to the next during the vehicle refit cycle.

An urgent need exists to provide police and other law enforcement with a way to illuminate the area near a law enforcement vehicle to deter approach or entry within that area. A tailored illuminated area creates a "no drive zone" that deters motorists from getting too close to a law enforcement vehicle. This "no drive zone" coordinates with the state traffic laws and regulations for moving over to the left and slowing when passing a stopped police, emergency, road service, or DOT vehicle on side of the road. Such passing has heightened danger for law enforcement wearing black, navy blue, dark blue, and other dark uniforms who exit and return to their vehicles during nighttime traffic stops. However, police officers face an additional problem these days. Over half of the new police and law enforcement vehicles have the form of SUVs and trucks rather than the traditional sedans with trunks Current events involving protests, near riots, and riots have rapidly increased deployments of police and law enforcement. Those deployments have more officers and more locations encountering more bystanders than in the past. The presence of bystanders remains within the ability of the police to control and reflects the individual preferences and skills of each officer rather than traditional generic or standard "in every car" lighting, commonly seen as roof top lights, rotating lights, rotator lights, and the like. Keeping lighting on a patrol vehicle must be secure and its transfer between vehicles as rapid and easy for the officers. The lighting and related hardware must not impair an officer's visibility from with a vehicle and provide improvised weapons to prisoners near or in the vehicle.

DESCRIPTION OF THE PRIOR ART

Over the years, various mounts for lights upon vehicles have appeared. Army units utilize headlights within an open frame of steel band and blackout drive lights of two beams from one case. The open frame and case typically bolt upon a military vehicle bumper. Law enforcement utilizes modified civilian sedans, SUVs, and trucks. Those vehicles have existing headlights and rear lights commonly seen. Those vehicles have their lighting often enclosed for improved aerodynamic. Additional lighting upon those vehicles for police takes a different solution. An acceptable location and mounting solution for these types of lights often presents difficulty, cumbersome, damaging to the vehicle, & often very conspicuous.

In many cases, the vehicles have relatively short in-service life with departments. Thus, lighting upon them may have to demount and reinstall on another vehicle promptly. The common first responder vehicles often utilize standard car washes so lighting must be secure, of a low profile, and of few sticking points for bristles.

In police applications, more and more police vehicles are "slick top" and no longer use roof mounted lighting, to keep a lower profile for many reasons including traffic enforcement. While many of the police vehicles have gone to the lower profile lighting and appearance, safety and requirements of the officers' job remain the same for exiting their vehicles or parking the vehicles in dangerous locations, high traffic areas, and along high-speed highways. The need for the safety zones and lanes, and providing a warning to motorists becomes just as critical or more so than for traditional vehicles with roof mounted lights.

The prior art has also provided various lighting systems and their mounts. These systems follow the trend of a slick top and illuminate broad swaths above, behind, and around a vehicle as presently seen. However, the prior art does not yet illuminate a linear boundary closely around a vehicle from a light located upon a vehicle door.

SUMMARY OF THE INVENTION

The mount for inverted light has a back, two spaced apart feet beneath the back, two tabs outwardly from the back, each tab having two pieces, an arcuate shroud opposite the back and an adjustment mechanism for the tabs. Opposite the back, the feet and tabs have a low friction surface limiting engagement of the mount with door glass. The adjustment mechanism includes knobs turning rack pinion gearing and knobs ratcheting one piece of a tab outwardly from the other. Beneath the shroud, the mount has two rests that receive a light attached to them aimed downward from the shroud. The mount has an elongated form for a generally centered position along the width of a door's window.

There has thus been outlined, rather broadly, the more important features of the invention in order that the detailed description thereof that follows may be better understood and that the present contribution to the art may be better appreciated. The present invention also includes a continuous cross section suitable for extrusion, a receptacle for a light with the receptacle spanning from the shroud to the lower rest, and a forward edge of the shroud having an aerodynamic profile. Additional features of the invention will be described hereinafter, and which will form the subject matter of the claims attached.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the present invention is to provide a mount for inverted light that holds a light aimed down to the ground around and beneath police vehicle.

Another object is to provide such a mount for inverted light that provides two or more cooperating parts that mutually connect to fit the space of vehicle door window glass opening.

Another object is to provide such a mount for inverted light that locates at the bottom of the vehicle door window glass area, just above or upon the lower door section.

Another object is to provide such a mount for inverted light that locates at the bottom of an emergency vehicle window keeping the driver's line of sight clear and also positions the horizontal LED lighting closer to oncoming driver's field of view than in the prior art location on the roof of an emergency vehicle.

Another object is to provide such a mount for inverted light that sits low towards the bottom of the glass area to limit or to eliminate blind spots, such as those caused by locating lighting, as in LED lights, or other mounting brackets higher into the line of sight of the vehicle's driver.

Another object is to provide such a mount for inverted light that has tabs or extensions that slide into the door's window track or window frame to guide, orient, and secure, the bracket in position.

Another object is to provide such a mount for inverted light that has bumpers, pads, or standoffs, along the inward face of the invention near the window glass to dampen vibration induced by the invention against glass.

Another object is to provide such a mount for inverted light that accepts LED or other lighting attached to its bracket via apertures/points on the lower face of the bracket along a horizontal plane.

Another object is to provide such a mount for inverted light that has a vertical plane upon the interior of its bracket that may include slots or apertures for additional mounting locations or positioning of primary lights and secondary lights.

Another object is to provide such a mount for inverted light that has its mounting bracket that has sufficient room for aiming or adjusting of LED or other lighting angles towards the ground around or beneath a vehicle.

Another object is to provide such a mount for inverted light that adjusts the LED light heads of the lighting from a horizontal orientation to a downward angle for allow aiming and positioning of the light signal emitted therefrom.

Another object is to provide such a mount for inverted light that allows users to remove the LED lighting from a specific vehicle's bracket and transfer the LED lighting to another vehicle's mounting bracket as may occur when a vehicle design changes, or another make, or model replaces a vehicle.

Another object is to provide such a mount for inverted light that works equally well and installs in similar location on vehicles with roof lights as well as vehicles without roof lighting.

Another object is to provide such a mount for inverted light that protects and at least partially conceals the LED lighting from weather and surreptitious observation.

Another object is to provide such a mount for inverted light made and distributed at a price suitable for purchase by law enforcement officers and various departments and agencies through retail stores, catalog supply houses, government contracting and procurement, and the like.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In referring to the drawings,

FIG. 4 illustrates a section view through a door of a vehicle having the invention thereon;

FIG. 4a illustrates a section view through a door of a vehicle having the invention thereon and alternate aiming of lighting;

FIG. 5 provides an enlarged front view of the invention;

FIG. 6 provides a section view through the invention;

The same reference numerals refer to the same parts throughout the various figures.

DESCRIPTION OF THE PREFERRED EMBODIMENT

Figure 1:
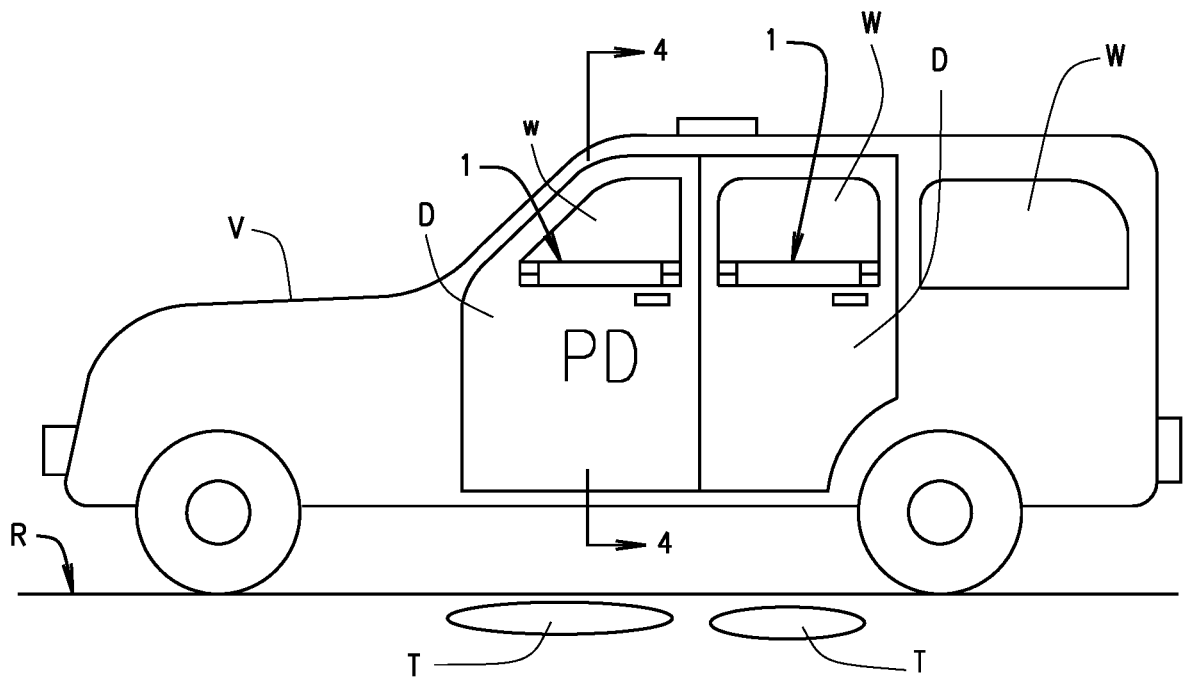
FIG. 1 provides a side view of a vehicle having the invention thereon.

The present art overcomes the prior art limitations by providing a mount for inverted light. Such a mount may take on many forms. However, this invention holds a light inverted as the invention 1 itself remains upon a door D of a vehicle V with impeding movement of glass of a window W as shown in FIG. 1. FIG. 1 has a side view of a law enforcement vehicle V that has doors D typical of automotive manufacturers. Though this description refers to law enforcement vehicles, other vehicles are included such as fire department, private security, government inspectors, hazardous waste disposal, military police, air police, shore patrol, and the like. Though this description and the drawings suggest a sport utility vehicle, this invention also applies to sedans, pickup trucks, trucks, and other vehicles utilized by law enforcement. The vehicle V travels upon a road R or other surface. The vehicle has doors upon its sides as shown and commonly seen. Each door has a window W, generally movable between an upper closed position and a lower open position at the discretion of the driver. The invention 1 installs at the lower portion of a window W where the glass inserts within the door D. FIG. 1 shows the invention at the base of a triangular window W for a driver's door and at the base of a somewhat rectangular window W of a passenger door rearward of the driver's door. The invention 1 retains a light source, later shown, that illuminates the road R near each door D that has the invention installed. This illumination may have various apparent shapes that show a target area T. The target area T informs a motorist, bystander, pedestrian, or person to stay away from the interior of the target area. More particularly, the targets T illuminated by existing lights emplaced in the invention have the primary benefit of a safety feature from light patterns or areas around a portion of, or all of, the vehicle. This creates a "visual barrier" seen by a motorist or other person that designates a virtual no drive through area or a no drive-in area.

The invention as shown sits low at the bottom of the window upon its glass to limit or eliminate blind spots caused by locating the light source or other brackets higher into the driver's line of sight. More particularly, the invention has its installed location at the bottom of a door window, just above or upon the top of a door section as later shown in FIG. 4.

Figure 2:
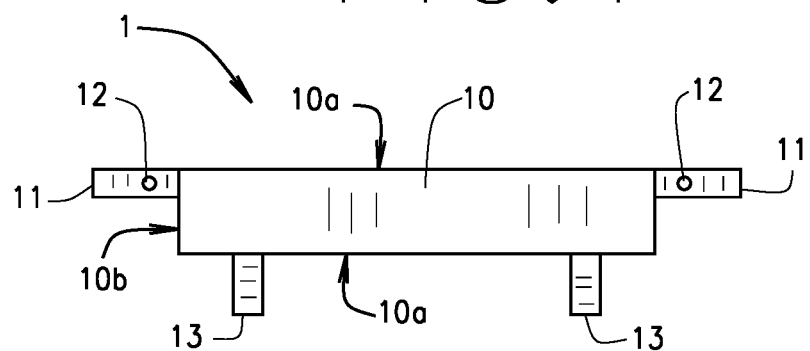
FIG. 2 shows a front view of the invention.

FIG. 2 shows a front view of the invention 1 as seen from outside of the vehicle V. The invention has an elongated shroud 10 here shown of apparent rectangular shape. The shroud has its length parallel to its two spaced apart longitudinal sides, 10a, as shown. The shroud's longitudinal sides have an orientation generally perpendicular to the door's axis of rotation. Perpendicular to the longitudinal sides, the shroud has two lateral ends 10b as shown. This description refers to horizontal where the widest portion of the invention extends from left to right, that is, across a window, as in FIG. 1. Depending upon terrain and road grade, a vehicle may attain an angle to the sky's horizon. Here though, the longitudinal sides 10a generally appear perpendicular to the door's rotational axis regardless of the vehicle's attained angle. The door's rotational axis extends through its hinges that connect to the vehicle's body, generally, the axis of door pivot, typically perpendicular to the vehicle's customary direction of travel. This description refers to vertical where the shortest portion of the invention extends from bottom towards top, that is, up a window, as in FIG. 1. Here though, the lateral ends 10b generally appear parallel to the door's rotational axis regardless of the vehicle's attained angle. From each end, the shroud has a telescoping bracket, or tab 11. Each tab extends or retracts using a knob 12 upon one part of a rack and pinion gear system, or related longitudinal extension mechanism so that the knob allows the tab to slide into the window's track or frame to position and secure the tab and thus the invention in place. The tab has two parts with the knob upon one part mechanically engaging a second part. The second part slidingly extends from the first part. The two parts move collinearly. The tabs have their locations towards one longitudinal side, generally towards the glass of a window and upward from the door as later shown.

Opposite the tabs spaced upon the other longitudinal side, the invention has its feet 13, here shown as two and spaced apart. The feet extend beneath the shroud 10, more particularly the back, that is, depend from it. The feet fit between the glass and the inside of a door and rest upon glass surface to cushion it against vibration imparted to it from the invention during motion of the door and of the vehicle. As later shown, the feet have a low friction surface, bumpers, or pads, in contact with the surface of the glass. More particularly, in an alternate embodiment the feet and the tabs have a material hardness less than glass. Thus, they avoid scratching of glass as at W and the lesser hardness also allows for sliding of the glass past the feet and the tabs.

Figure 3:
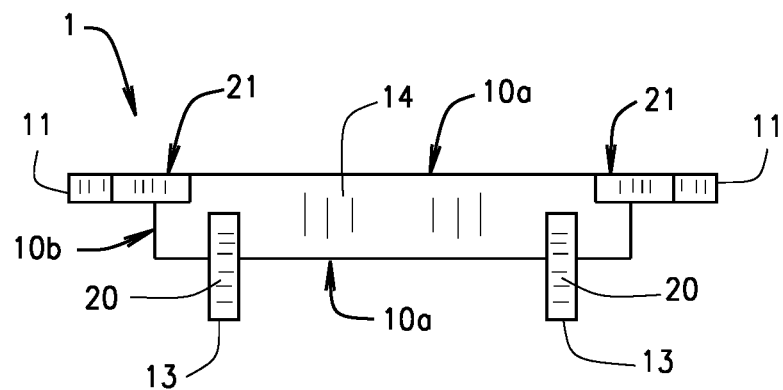
FIG. 3 describes a back view of the invention.

FIG. 3 then describes a back view of the invention 1 where the invention abuts the glass of a window W as previously shown in FIG. 1. The invention has an elongated back 14 of rectangular form opposite the shroud. The back extends from the upper of the two longitudinal edges of the shroud downward to its own longitudinal edge. The two longitudinal edges of the back are mutually parallel and spaced apart. Spaced apart and perpendicular to the longitudinal edges, the back that has its lateral ends. Proximate the shroud, the back has the two tabs 11 extending oppositely outward. The tabs have a thin cross section suitable for insertion between the window glass and the adjacent door frame. In this embodiment, the tabs attach to the back and each tab presents a low friction surface 21 abutting the window glass. The portion of the tab, or part, with the low friction surface 21 generally remains in position while the remainder of the tab, or second part, extends and retracts to fit various size windows during usage. The parts of the tabs extend and retract collinearly.

Opposite the tabs and perpendicular to them, the back 14 has the feet 13 extending downward from the back. The feet also have their low friction surface 20 upon their length as the window glass passes along the entire length of the feet during its movement up and down. The back also may have slots or holes for additional mounting locations or positioning of primary or secondary lights as later suggested in FIG. 4.

When a law enforcement officer or other driver opens his door D, the invention 1 or mount appears in a sectional view in FIG. 4. The auto manufacturer provided the door D with the vehicle V. The door has a window W typically upon the upper portion of the door as shown. The window W has its location above the armrest of the door so that the driver has may see through when in a seated position. The invention 1 fits outward of the window glass and into the door as shown. The invention receives a light source L such as light emitting diode, or LED, utilizing mounting holes, not shown, other attachments, or a receptacle as later shown, beneath the shroud along horizontal plane. The invention 1 allows a driver to position the light source L and aim it generally downward to cast its beam B upon the nearby road R creating target T on the road's surface visible to pedestrians and bystanders.

Though the invention receives a light source L that illuminates the target T, the invention allows a user of it to position light sources L at desired locations, as later explained in FIG. 8. The mount and its various rests allow light sources L to emit their beams B and project boundaries of various shapes. Moreover, the boundaries may have an apparent linear edges but enclose shapes being round, polygonal, and other non-linear shapes. The prior art has few linear shaped exclusion lights. The Application foresees more users of the invention placing existing LED warning lights into the invention that prior art spot, flood, or fog type lights.

Alternately, when a law enforcement officer approaches a scene, his vehicle has its door D and the invention 1 mounts to it as shown in a sectional view in FIG. 4a and emits light outward. The door has its window W upon the upper portion of the door as shown. Then the invention 1 fits outward of the window glass and into the door as previously shown and described. The invention receives has its light source L such as light emitting diode, or LED, as before, as later shown, beneath the shroud but upright similar to a vertical plane. The invention 1 allows a driver to position the light source L and aim it generally outward from the vehicle to cast its beam B away, identifying the vehicle to onlookers, and creating target T on any nearby object, such as a fence, a wall, an alley, or an adjacent vehicle.

Then as shown in FIG. 5, the mount of the invention appears in an enlarged front view within the two tabs, not shown. The invention 1 has its shroud 10 as before. Beneath the shroud appears a portion of the back 14 in the background. Beneath the shroud and extending perpendicular from the back, the invention has an upper rest 22 with the same length as the shroud. The upper rest extends from the back towards the shroud. The upper rest though does not contact the shroud as the shroud has a spacing or a gap outward from the upper rest. Beneath the upper rest, the invention has its lower rest 23 generally parallel to the upper rest and spaced in front of the back. The lower rest extends outward from the back towards the shroud. In the foreground of this figure shown above the upper rest 22, the shroud 10 has its tip that terminates in a lens 17. The lens has at least translucent material for its construction and may raise its material to transparent. The lens 17 permits passage of light therethrough in a horizontal orientation as previously shown in FIG. 4a. The upper rest 22 and the lower rest 23 mutually cooperate to receive and to secure a light source as shown before in FIG. 4. The light source, or LED lighting connect to at least two mounting holes or a hat channel along both rests, or points, on the lower surfaces of the rests so the light source has a common horizontal plane. Beneath the lower rest, the feet 13 of the invention appear.

Figure 6A:
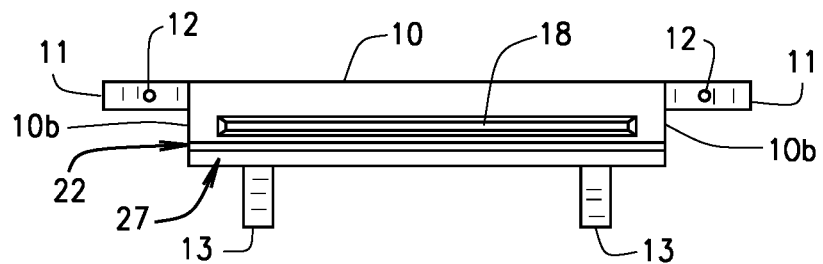
FIG. 6a provides a front view of the invention with lens removed.

Turning the invention to an end, FIG. 6 provides a section view through the invention showing its form more clearly. The invention has its shroud 10 generally shown arcuate, descending downward, from the back toward the lower rest. This orientation of the shroud sheds moisture and shields the light source from unnecessary upward illumination. The shroud has its tip 15 here shown free and to the right. The tip has its position spaced outward from the upper rest. Opposite the tip, the shroud joins to a longitudinal edge of the back 14. The back descends from the shroud generally perpendicular. About midway upon the height of the back, it has the upper rest 22 extending perpendicular to the back and beneath the shroud. The upper rest has its length, shown less than that of the shroud. The upper rest and the lower rest cooperate to provide sufficient spacing for aiming or adjusting of LED light angles as part of a lighting system. In an alternate embodiment, the tip 15 has the lens 17 as the free end itself. The lens may have the material of translucent, transparent, or coloration, as an integral part of the tip, or the lens may have its separate form that fits, or press fits into a recess in the free end as later shown in FIG. 6a. Spaced beneath the upper rest 22, the invention has its lower rest 23 generally parallel to the upper rest. Outward from the back, the lower rest has its own free end, as at 27, perpendicular to the lower rest and extending towards the upper rest 23 as shown.

Additionally, the shroud 10 guides wiring from the LED lighting along its length and to its ends 10b. The wiring, not shown, then connects to the vehicle's electrical system. The shroud does so using channels as at 24, 25. One channel, 24, appears at the intersection of the back 14 and the upper rest 22. The channel has its position in the direction of the tip 15, orienting towards the shroud 10, that is, so the channel utilizes gravity to retain wiring within it. A second channel, 25, then appears below the first channel at the intersection of the back and the lower rest 23. This channel 25 has its position in the direction of the upper rest, or orienting towards it, that is, away from the tip, and the channel also has gravity retaining wiring within it. Both channels 24, 25 have a generally rounded shape as shown and extend for the length of the back. In a further alternate embodiment, the channels 24, 25 have clips, not shown, spaced along their lengths for mechanical retention of LED lighting wires.

In FIG. 6A, there the shroud 10 has its rectangular form with the tip 15 extending out of the plane of the figure. Proximate the free end of the tip 15, the tip has a recess 18 shaped to receive the lens 17, not shown as it is removed. The recess has a lesser length than that of the back, that is, it extends partially for the length of the back. In the preferred and alternate embodiments, the lens 17 allows an LED light upon the upper rest 22 to aim outward, perpendicular to the back 14, that is, horizontally, out from the door D, as previously shown in FIG. 4b.

Figure 7:
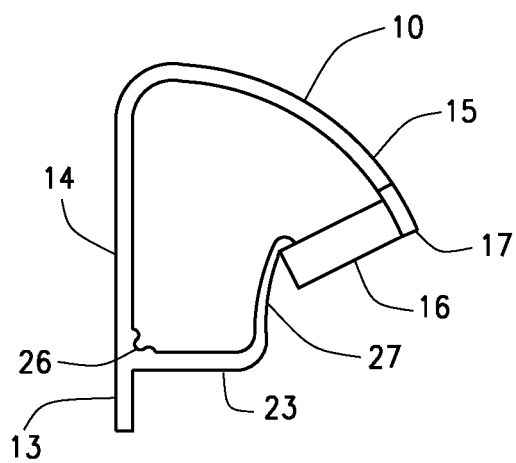
FIG. 7 shows a section view through an alternate embodiment of the invention.

Turning to FIG. 7, it shows a section view through an alternate embodiment of the invention. The mount 1 has its back 14 and shroud 10 extending from the back as before. Spaced below the shroud, the back has a lower rest 23 extending perpendicular and inward to the invention. Away from the back, the lower rest has its free end 27 extending into the invention as well and along the same direction as the back. More particularly, the free end has its spacing away from the back. The free end 27 has its length at least twenty percent of the length of the lower rest 23. The shroud has its arcuate form depending from the back to its tip as at 15. The shroud has its spacing outward from the free end. Joining to the tip 15, the invention has a receptacle 16 here shown as a rectangular section. The receptacle has its own cross section suitable for receiving a light. Inward from the tip's connection to the receptacle, the free end 27 terminates where it connects to the receptacle spaced away from the tip's connection as shown. The receptacle may have in an alternate embodiment a plurality of apertures there through for connection of a light to it. The receptacle joins to the lower rest spaced inwardly from the tip 15. In a further alternate embodiment, the tip 15 has a recess 18 that receives a lens 17.

And the shroud 10 of the FIG. 7 alternate embodiment also guides wiring of the LED lighting along its length and to its ends 10*b*. The wiring as above connects to the vehicle's electrical system. The shroud does so using another channel 26 with a rounded cross section as shown. The channel 26 appears in FIG. 7 at the intersection of the back 14 and the lower rest 23. The channel has its position in the direction of the tip 15, that is, so the channel utilizes gravity to retain wiring within it.

Figure 8:
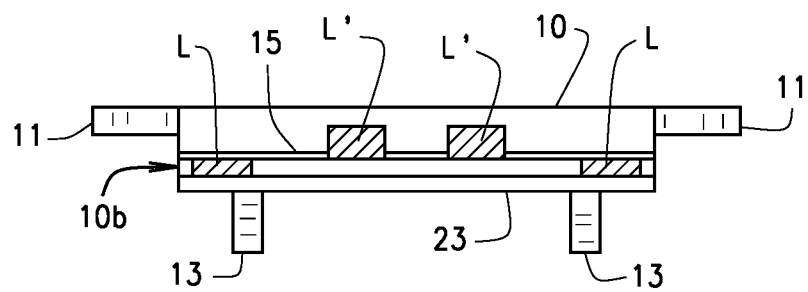
FIG. 8 provides a front view of the invention with lighting aimed parallel to the plane of the figure and other lighting aimed out of the plane of the figure.

That brings us to FIG. 8 where the invention holds lighting L utilizing hat channel or other mounts, not shown. The invention receives lighting aimed downward, that is, parallel to the back 14 and the feet 13 as shown by two lights L located outward of the four lights shown in this figure. And it receives lighting aimed outward, that is, towards the reader thus parallel to a plane defined by upper rest 22 as shown by two lights L' located central of the four lights shown in this figure.

In the preferred embodiment or the alternate embodiments, the invention or mount 1 allows users to remove the LED lighting from a one vehicle's mount 1 and transfer the LEDs, or other lighting to another vehicle's mounting bracket as when a vehicle design changes, or another make, or model replaces that vehicle.

The invention takes the form of a mount installed upon a window of a door of a law enforcement vehicle. The mount has an elongated back, two spaced apart feet depending from the back, two spaced apart tabs, each tab having two parts mutually collinearly extending, the tabs begin perpendicular to the feet, an elongated shroud opposite the back, and a lower rest extending outward from the back towards the shroud. The shroud then has an arcuate form extending from the back downward towards the lower rest and the lower rest receives an existing lighting system. Then the mount has an upper rest spaced inward from the lower rest towards the shroud and it has a length and extends perpendicular to the back while the shroud has a spacing outward from the upper rest. The mount also has a channel positioning where the back intersects with the upper rest and orienting towards the shroud. The channel extends along the back and has a rounded sectional shape. Meanwhile, the mount has another channel positioning where the back intersects with the lower rest and orienting towards the upper rest. This another channel also extends along the back and has a rounded sectional shape. The two channels then receive existing wiring from lighting placed within the mount. More particularly, the shroud has its tip spacing outward from the upper rest. The tip has a recess in it that partially extends along the back. As previously mentioned the recess receives a lens secured and the lens can be translucent, transparent, or of a color. Before or after installation, the mount can receive wiring and wiring harnesses of existing light secured upon it between the tip and the upper rest and the lighting emits light parallel to the upper rest outwardly through the lens.

The mount has another embodiment where its lower rest has a free end spacing away from the back towards the shroud. The shroud also spaces outward from the free end. The shroud then has another channel where the back intersects with the lower rest and orienting towards the shroud. This other channel extends along the back with its rounded sectional shape. As like before, this channel receives wiring from existing lighting placed within the mount. The mount in this embodiment also has the shroud with a tip spacing outward from the upper rest. The tip has a recess in it that partially extends along the back. The recess next receives a lens secured in it with the lens again being translucent, transparent, or a color of some sort. As before, the mount receives lighting placed into it between the tip and the lower rest that emits light parallel to the upper rest outwardly through the lens.

Both the preferred and the alternate embodiments may include a knob upon one part of one tab mechanically engaging the second part of the tab wherein the second part slidingly extends collinear from the one part, and another knob upon one part of the other tab mechanically engaging the second part of the other tab wherein the second part slidingly extends collinear from the one part.

From the aforementioned description, a mount for inverted light has been described. The mount for inverted light is uniquely capable of fitting against a door window and avoiding engagement with the window glass. The mount allows a user to aim a linear light just below its location. Further, the mount for inverted light may also have additional forms and shapes suitable for rapid manufacturing. The mount for inverted light and its various components may be manufactured from many materials, including but not limited to, polymers, such as nylon, polypropylene, polyvinyl chloride, high density polyethylene, polypropylene, ferrous and non-ferrous metal foils, their alloys, ceramics, and composites.

Various aspects of the illustrative embodiments have been described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations have been set forth in order to provide a thorough understanding of the illustrative embodiments. However, it will be apparent to one skilled in the art that the present invention may be practiced without the specific details. In other instances, well known features are omitted or simplified in order not to obscure the illustrative embodiments.

Various operations have been described as multiple discrete operations, in a manner that is most helpful in understanding the present invention, however, the order of description should not be construed as to imply that these operations are necessarily order dependent. In particular, these operations need not be performed in the order of presentation.

Moreover, in the specification and the following claims, the terms "first," "second," "third" and the like—when they appear—are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to ascertain the nature of the technical disclosure. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

I claim:

1. A mount installed upon a window of a door of a law enforcement vehicle comprising:
   an elongated back:
   two spaced apart feet depending from said back;
   two spaced apart tabs, each tab extending outwardly from said back, each tab having two parts mutually collinearly extending, the tabs begin perpendicular to the feet;
   an elongated shroud opposite said back;
   a lower rest extending outward from said back towards said shroud;
   said shroud having an arcuate form extending from said back downward towards said lower rest;
   said lower rest adapted to receive a lighting system;
   an upper rest spaced inward from said lower rest towards said shroud, said upper rest having a length and extending perpendicular to said back;
   said shroud spaced outwardly from said upper rest;
   said shroud having a tip spacing outward from said upper rest;
   said tip having a recess therein partially extending along said back; and
   said recess receiving a lens secured therein, said tens being one of translucent, transparent, and colored; and
   wherein said mount is adapted to receive lighting secured therein between said tip and said upper rest and wherein said mount is adapted to have the lighting emit light parallel to said upper rest outwardly through said lens.

2. The mount installed upon a window of a door of a law enforcement vehicle of claim 1 further comprising:
   said, lower rest having a free end spacing away from said back towards said shroud;
   said shroud spacing outwardly from said free end;
   another channel positioning where said back intersects with said lower rest and orienting towards said shroud, said another channel extending along said back and having a rounded sectional shape;
   wherein said channel is adapted to receive wiring from lighting placed within said mount.

3. The mount installed upon a window of a door of a law enforcement vehicle of claim6 further comprising: 2
   said shroud having a tip spacing outward from said upper rest;
   said tip having a recess therein partially extending along said back; and
   said recess receiving a lens secured therein, said lens being one of translucent, transparent, and colored:
   wherein said mount is adapted to receive lighting secured therein between said tip, and said lower rest and wherein said mount is adapted to have the lighting emit light parallel to said back downward from said shroud.

4. A mount installed upon a window of a door of law enforcement vehicle comprising:
   an elongated back;
   two spaced apart feet depending from said back;
   two spaced apart tabs, each tab having two parts mutually collinearly extending, the tabs begin perpendicular to the feet and each tab extending outwardly from said back;
   an elongated shroud opposite said back;
   a lower rest extending outward from said back towards said shroud;
   an upper rest spaced inward from said lower rest towards said shroud, said upper rest having a length and extending perpendicular to said back;
   said shroud spaced outwardly from said upper rest:
   said shroud having an arcuate form extending from said back downward towards said lower rest said lower rest adapted to receive a lighting system;
   said shroud having a tip spacing outward from said upper rest;
   said tip having a recess therein partially extending along said back;
   said recess receiving a lens secured therein, said lens being one of translucent, transparent, and colored; and
   wherein said mount is adapted to receive lighting secured therein between said tip and said upper rest and wherein said mount is adapted to have the lighting emit light parallel to said upper rest outward through said lens.

5. A mount installed upon a window of a door of a law enforcement vehicle comprising:
   an elongated back;
   an elongated shroud opposite said back;
   a lower rest extending outward from said back towards said shroud;
   said shroud having an arcuate form extending from said back downward towards said lower rest;
   said lower rest adapted to receive a lighting system;
   said lower rest having a free end spacing away from said back towards said shroud;
   said shroud spacing outwardly from said free end;
   a channel positioning where said back intersects with said lower rest and orienting towards said shroud, said channel extending along said back and having a rounded sectional shape; and
   wherein said channel is adapted to receive wiring from lighting placed within said mount.

6. The mount installed upon a window of a door of a law enforcement vehicle of claim 5 further comprising:
   said shroud having a tip spacing outward from said upper rest;
   said tip having a recess therein partially extending along said back; and
   said recess receiving a lens secured therein, said lens being one of translucent, transparent, and colored;
   wherein said mount is adapted to receive lighting secured therein between said tip and said lower rest and wherein said mount is adapted to have lighting emit light parallel to said back downward from said shroud.

7. The mount installed upon a window of a door of a law enforcement vehicle of claim 6 further comprising:
   two spaced apart feet depending from said back;
   two spaced apart tabs, each tab extending outwardly from said back and each tab having two parts mutually collinearly extending, said tabs begin perpendicular to said feet.

8. The, mount installed upon a window of a door of a law enforcement vehicle of claim 7 further comprising:
a knob upon one part of one tab mechanically engaging the second part of the tab wherein the second part slidingly extends collinear from the one part; and
another knob upon one part of the other tab mechanically engaging the second part of the other tab wherein the second part slidingly extends collinear from the one part.

\* \* \* \* \*